(12) United States Patent
Mielke et al.

(10) Patent No.: US 12,703,229 B2
(45) Date of Patent: Aug. 11, 2026

(54) TRUCK WINDOWS

(71) Applicant: PACCAR Inc, Bellevue, WA (US)

(72) Inventors: David Mielke, Bellevue, WA (US); Clifton Ellis, Bellevue, WA (US); David Leetz, Bellevue, WA (US); Preston Godinich, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 368 days.

(21) Appl. No.: 18/490,645

(22) Filed: Oct. 19, 2023

(65) Prior Publication Data

US 2025/0128576 A1 Apr. 24, 2025

(51) Int. Cl.

| | |
|---|---|
| ***B60J 1/14*** | (2006.01) |
| ***B60J 1/02*** | (2006.01) |
| ***B60J 1/10*** | (2006.01) |
| ***B62D 25/04*** | (2006.01) |
| ***B62D 33/06*** | (2006.01) |
| ***E05F 15/63*** | (2015.01) |

(52) U.S. Cl.

CPC . *B60J 1/14* (2013.01); *B60J 1/02* (2013.01); *B60J 1/10* (2013.01); *B62D 25/04* (2013.01); *E05F 15/63* (2015.01); *B62D 33/06* (2013.01); *E05Y 2900/516* (2013.01); *E05Y 2900/55* (2013.01)

(58) Field of Classification Search

CPC ....... B60J 1/14; B60J 1/02; B60J 1/10; B62D 25/04; B62D 33/06; E05F 15/63; E05Y 2900/516; E05Y 2900/55; E05Y 2400/41

See application file for complete search history.

(56) References Cited

U.S. PATENT DOCUMENTS

| | | | | |
|---|---|---|---|---|
| 2,098,357 A * | 11/1937 | Piroumoff | B60P 3/007 | 296/25 |
| 4,700,980 A * | 10/1987 | Jozefczak | B60J 1/20 | 296/180.1 |
| 7,651,158 B2 * | 1/2010 | Koizumi | B62D 25/16 | 296/191 |
| 9,556,664 B2 * | 1/2017 | Hudepohl | E05F 15/63 | |
| 11,628,748 B2 * | 4/2023 | Andrews | B60N 2/065 | 296/190.1 |
| 2007/0095633 A1 * | 5/2007 | Sakai | H01H 13/7057 | 200/1 R |
| 2019/0322157 A1 * | 10/2019 | Harris | B60H 1/267 | |
| 2023/0311625 A1 * | 10/2023 | Rausch | B60J 1/10 | 296/190.1 |

* cited by examiner

*Primary Examiner* — Jonathan Malikasim

(74) *Attorney, Agent, or Firm* — Seed Intellectual Property Law Group LLP

(57) ABSTRACT

A heavy-duty truck includes a cabin, a window having an upper edge region and a lower edge region, a hinge that rotatably couples the upper edge region of the window to the cabin, and a motor-driven actuator coupled to the lower edge region of the window such that actuation of the motor-driven actuator in a first direction moves the lower edge region of the window away from the cabin, thereby opening the window to an open position, and actuation of the motor-driven actuator in a second direction opposite to the first direction moves the lower edge region of the window toward the cabin, thereby closing the window to a closed position.

18 Claims, 7 Drawing Sheets

120
120
116
118

TRUCK WINDOWS

BACKGROUND

Technical Field

The present disclosure relates to windows for use with trucks, in particular, with heavy-duty center-drive trucks.

Description of the Related Art

Driver visibility is important in motor vehicles. Driver visibility is a particularly important and complex matter in heavy-duty trucks and other vehicles where the driver sits relatively high above the road surface, as it can become more difficult to ensure adequate visibility as height differentials between vehicles and drivers increases.

Historically, most motor vehicles have been either left-hand drive or right-hand drive vehicles (generally for driving on the right-hand side or left-hand side of the road, respectively), in which the driver sits on either the left-hand side or the right-hand side of the vehicle or a cabin or cab thereof, leaving the opposite side available for a passenger, cargo, etc. Recently, however, there has been increased interest in center-drive trucks, in which the driver sits in the center of the vehicle (along a left-right or lateral axis), for a variety of reasons.

BRIEF SUMMARY

A heavy-duty truck may be summarized as comprising: a cabin; a window having an upper edge region and a lower edge region; at least one hinge that rotatably couples the upper edge region of the window to the cabin to move between a closed position and an open position; and at least one motor-driven actuator coupled to the lower edge region of the window such that actuation of the motor-driven actuator in a first direction moves the lower edge region of the window away from the cabin, thereby opening the window to the open position, and actuation of the motor-driven actuator in a second direction opposite to the first direction moves the lower edge region of the window toward the cabin, thereby closing the window to the closed position.

The motor-driven actuator may include an output shaft that extends along a substantially vertical axis, and an arm that extends substantially horizontally from the output shaft to the lower edge region of the window. The hinge may rotatably couple the upper edge region of the window to a window frame secured to a window opening of the cabin. The heavy-duty truck may further comprise a gasket seal that seals a peripheral portion of the window to a peripheral portion of the window frame when the window is in the closed position. The at least one hinge may comprise a pair of hinges that rotatably couple the upper edge region to the window to the cabin, and the at least one motor-driven actuator may comprise a pair of motor-driven actuators that are coupled to the lower edge of the window such that actuation of the pair of motor-driven actuators in a first direction moves the lower edge region of the window away from the cabin, thereby opening the window to the open position, and actuation of the pair of motor-driven actuators in a second direction opposite to the first direction moves the lower edge region of the window toward the cabin, thereby closing the window to the closed position.

The window, the at least one hinge and the at least one motor-driven actuator may form a first window assembly of the heavy-duty truck, and the heavy-duty truck may further comprise a second window assembly. The first window assembly may be on a first side of the cabin and the second window assembly may be on a second side of the cabin opposite to the first side of the cabin. The second window assembly may be a mirror image of the first window assembly. The first window assembly may be configured to be actuated, independently of the second window assembly, by a first electrical signal initiated by a human occupant of the cabin interacting with a human-machine interface inside the cabin; and the second window assembly may be configured to be actuated, independently of the first window assembly, by a second electrical signal initiated by the human occupant of the cabin interacting with the human-machine interface inside the cabin. The heavy-duty truck may be a center-drive truck. The cabin may be devoid of roll-down windows that translate substantially vertically to open.

A heavy-duty truck may be summarized as comprising: a cabin including a door having a door window; at least one windshield adjacent to and forward of the door window; and a lower window forward of the door window and below the windshield and spaced apart from the door window and the windshield. The lower window may be spaced apart from the door window and the windshield by at least two inches. The door window and lower window may be on a first side of the cabin and the heavy-duty truck may further comprise another door window and another lower window that are arranged in a mirror-image configuration on a second side of the cabin opposite to the first side of the cabin. The lower window may be rotatable relative to the cabin and may be configured to rotate between an open position and a closed position. The door window may be stationary and not configured to open or close relative to the door, and the at least one windshield may be stationary and not configured to open or close.

At least a portion of the lower window may be located lower than at least a portion of a hood of the heavy-duty truck. A majority of the lower window by surface area may be located lower than a majority of the hood of the heavy-duty truck by surface area. An entirety of the lower window may be located lower than an entirety of the hood of the heavy-duty truck. At least a portion of the lower window may be located lower than at least a portion of a chest of a driver seated in the heavy-duty truck. A majority of the lower window by surface area may be located lower than a majority of the chest of the driver by surface area. An entirety of the lower window may be located lower than an entirety of the chest of the driver. At least a portion of the lower window may be located at an elevation that is between a lower chest of a driver seated in the heavy-duty truck and feet of the driver of the heavy-duty truck. A majority of the lower window by surface area may be located at an elevation that is between a lower chest of a driver seated in the heavy-duty truck and feet of the driver of the heavy-duty truck. An entirety of the lower window may be located at an elevation that is between a lower chest of a driver seated in the heavy-duty truck and feet of the driver of the heavy-duty truck.

At least a portion of the lower window may be located at an elevation that is between a lower end of the windshield and an upper end of a fender of the heavy-duty truck. A majority of the lower window by surface area may be located at an elevation that is between a lower end of the windshield and an upper end of a fender of the heavy-duty truck. An entirety of the lower window may be located at an elevation that is between a lower end of the windshield and an upper end of a fender of the heavy-duty truck. At least a portion of the lower window may be located along a fore-aft axis at a location that is forward of drive wheels of the heavy-duty truck. A majority of the lower window by surface area may be located along a fore-aft axis at a location that is forward of drive wheels of the heavy-duty truck. An entirety of the lower window may be located along a fore-aft axis at a location that is forward of drive wheels of the heavy-duty truck. At least a portion of the lower window may be located along a fore-aft axis at a location that is between a rear end of drive wheels of the heavy-duty truck and a headlight of the heavy-duty truck. A majority of the lower window by surface area may be located along a fore-aft axis at a location that is between a rear end of drive wheels of the heavy-duty truck and a headlight of the heavy-duty truck. An entirety of the lower window may be located along a fore-aft axis at a location that is between a rear end of drive wheels of the heavy-duty truck and a headlight of the heavy-duty truck.

A heavy-duty truck may be summarized as comprising: a cabin including a door having a door window; at least one windshield adjacent to and forward of the door window; and a lower window forward of the door window and below the supplemental windshield; wherein, when the heavy-duty truck is on a roadway surface and a driver is seated in the cabin in a driving position, a portion of the roadway surface visible to the driver includes an island of visibility that includes a portion of the roadway surface visible through the lower window.

The door window and the lower window may be on a first side of the cabin and the heavy-duty truck may further comprise another door window and another lower window that are arranged in a mirror-image configuration on a second side of the cabin opposite to the first side of the cabin. The lower window may be rotatable relative to the cabin and may be configured to rotate between an open position and a closed position. The door window may be stationary and may not be configured to open or close relative to the door, and the supplemental windshield may be stationary and may not be configured to open or close.

When a driver seated in the cabin has a height at the median adult male height and a passenger vehicle is driving in a center of a lane adjacent to the heavy-duty truck, the driver may have visibility of at least 50%, at least 55% or at least 60% of the profile of the passenger vehicle that would be visible to the driver if the cabin did not obstruct their view. When a driver seated in the cabin has a height at the fifth percentile adult female height and a passenger vehicle is driving at an edge of a lane adjacent to the heavy-duty truck, the driver may have visibility of at least 25%, at least 30%, or at least 35% of the profile of the passenger vehicle that would be visible to the driver if the cabin did not obstruct their view. The at least one windshield may include a supplemental windshield that is adjacent to and aft of a main windshield and separated by or interfacing at an A-pillar of the heavy-duty truck.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Figure 1:
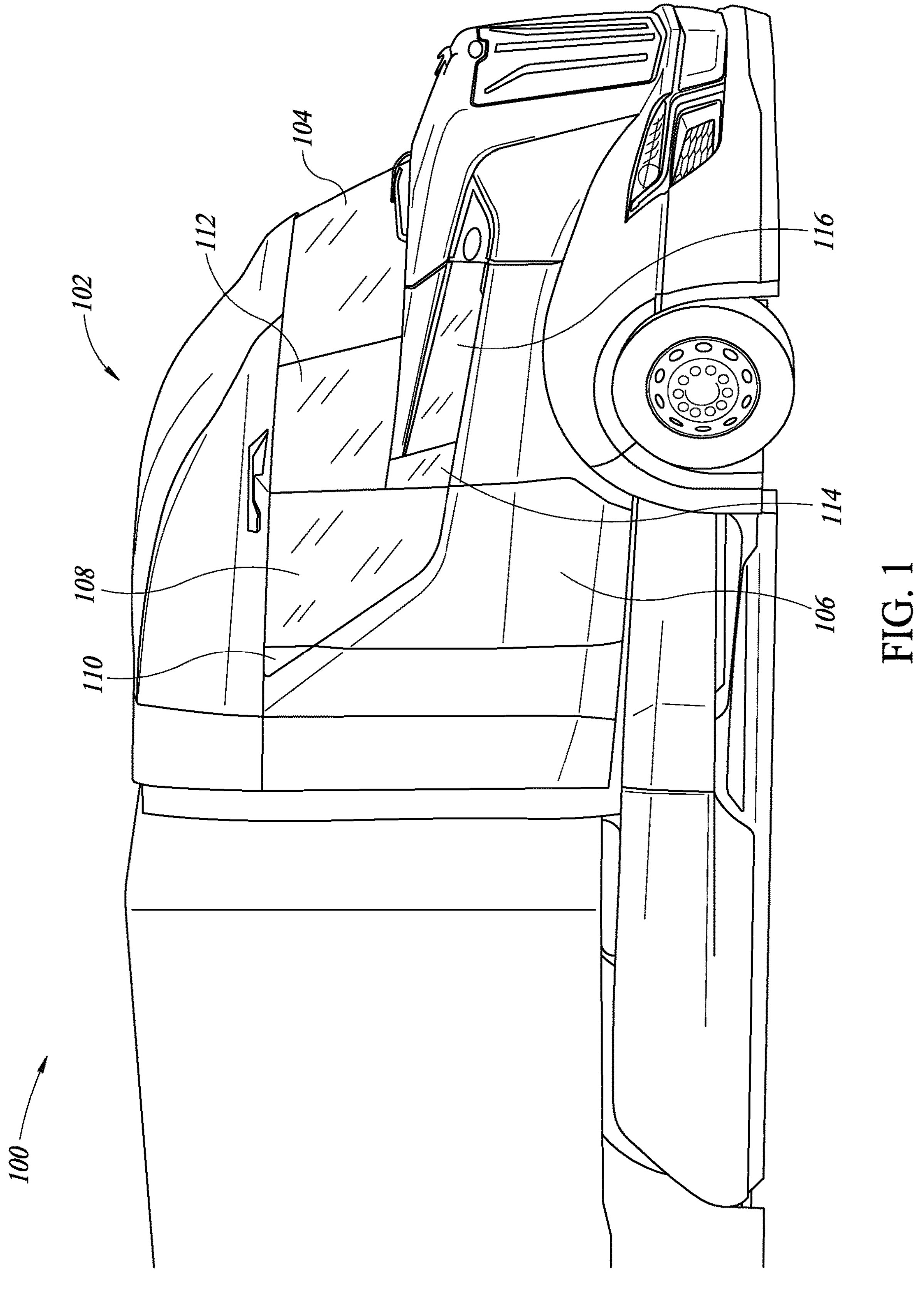
FIG. 1 illustrates a heavy-duty truck.

FIG. 1 illustrates a center-drive truck 100 and a cabin or cab 102 of the truck 100. As illustrated in FIG. 1, the cab 102 of the truck 100 includes a windshield 104, which may also be referred to as a "main windshield," and up to, or at least, five right-side windows. Each of the right-side windows may be made of glass or any other material known in the art for use as automotive windows. FIG. 1 illustrates primarily a right side of the truck 100 and its cab 102 and windows thereof, and the cab 102 includes windows on a left side thereof, where the windows on the left side can be the same as, similar to, and/or a mirror image of, the windows on the right side, as illustrated in FIG. 1. Thus, the cab 102 may have five left-side windows that are mirror images of the five right side windows illustrated in FIG. 1.

As used herein, the phrases "left-hand side" and "left" generally refer to the side of a truck that is on the left from the perspective of an occupant who is facing forward inside the truck, which is generally where a driver's seat and controls are located in a vehicle manufactured for the American market or any other market that drives on the right side of the roadway. Similarly, as used herein, the phrases "right-hand side" and "right" generally refer to the side of a truck that is on the right from the perspective of an occupant who is facing forward inside the truck, which is generally where a passenger's seat is located in a vehicle manufactured for the American market or any other market that drives on the right side of the roadway.

As used herein, the phrases "front" and "back" and other similar terminology take their common meaning, such that a cab or cabin and an engine of a truck are generally at the front of the truck and opposite the rear of the truck. As used herein, the phrases "up," "down," "above," and "below," and other similar terminology, take their common meaning, that is, such that gravity pulls objects down.

FIG. 1 illustrates that the cab 102 includes a right-side door 106, through which a driver or other occupant of the cab 102 may enter and exit the cab 102. FIG. 1 further illustrates that the door 106 includes, at a top or upper portion thereof, a first right-side window 108, which may also be referred to as a "door window," such that the window 108 rotates outward from a main body portion of the cab 102 when the door 106 is opened, and rotates inward toward the main body portion of the cab 102 when the door 106 is closed. FIG. 1 further illustrates that the cab 102 includes a second right-side window 110 behind the first right-side window 108, that is, behind the right-side door 106 ("behind," in this sense, indicates that the second right-side window 110 is closer to the rear of the truck 100 than the first right-side window 108, that is, "behind" can also mean "aft"). In some embodiments, the cab 102 does not include the second right-side window 110, and the area where the second right-side window 110 is illustrated and positioned is instead an opaque component, such as a structural or aerodynamic component of the cab 102.

FIG. 1 further illustrates that the cab 102 includes a third right-side window 112, which may also be referred to as a "supplemental windshield," in front of the first right-side window 108, that is, in front of the right-side door 106 ("in front of," in this sense, indicates that the third right-side window 112 is farther from the rear of the truck 100 than the first right-side window 108). As illustrated in FIG. 1, a front end of the third right-side window 112 is adjacent to and aligned with a right-most and rear-most end of the windshield 104, and may be separated from the windshield 104 by, or interface with the windshield 104, at an A-pillar of the heavy-duty truck 100. The front end of the third right-side window 112 has a height that is the same as a height of the right-most and rear-most end of the windshield 104, such that the third right-side window 112 visually resembles a rearward extension of the windshield 104. A rear end of the third right-side window 112 is adjacent to and aligned with a front end of the first right-side window 108. The rear end of the third right-side window 112 has a height that is smaller than a height of the front end of the first right-side window 108, and is aligned with a top or upper portion thereof, such that the third right-side window 112 visually resembles a forward extension of the upper portion of the first right-side window 108.

FIG. 1 further illustrates that the cab 102 includes a fourth right-side window 114 in front of the first right-side window 108, that is, in front of the right-side door 106, and below the third right-side window 112. As illustrated in FIG. 1, a rear end of the fourth right-side window 114 is adjacent to and aligned with the front end of the first right-side window 108 and a top end of the fourth right-side window 114 is adjacent to and aligned with a bottom end of the third right-side window 112. The rear end of the fourth right-side window 114 has a height that is smaller than a height of the front end of the first right-side window 108, and is aligned with a bottom or lower portion thereof, such that the fourth right-side window 114 visually resembles a forward extension of the lower portion of the first right-side window 108. The rear ends of the third right-side window 112 and the fourth right-side window 114 have a combined height that is the same as the height of the front end of the first right-side window 108, such that, taken together, the third right-side window 112 and the fourth right-side window 114 visually resemble a forward extension of the first right-side window 108. In some embodiments, the cab 102 does not include the fourth right-side window 114, and the area where the fourth right-side window 114 is illustrated and positioned is instead an opaque component, such as a structural or aerodynamic component of the cab 102.

FIG. 1 further illustrates that the cab 102 includes a fifth right-side window 116, which may also be referred to as a "lower window," in front of the fourth right-side window 114 and below the third right-side window 112. As illustrated in FIG. 1, a rear end of the fifth right-side window 116 is adjacent to and aligned with the front end of the fourth right-side window 114 and a top end of the fifth right-side window 116 is below and spaced apart from a bottom end of the third right-side window 112. For example, the fifth right-side window 116 may be spaced apart from the bottom end of the third right-side window 112 by a body panel, fairing, or other opaque component of the cab 102, such as a structural, aerodynamic, or other component thereof. The rear end of the fifth right-side window 116 has a height that is smaller than a height of the front end of the fourth right-side window 114, and is aligned with a bottom or lower portion thereof, such that the fifth right-side window 116 visually resembles a forward extension of the lower portion of the fourth right-side window 114.

The fifth right-side window 116 may be vertically spaced apart from the third right-side window 112, such as by a body panel, fairing, or other opaque component of the cab 102, such as a structural, aerodynamic, or other component thereof. The vertical spacing between the fifth-right side window 116 and the third right-side window 112 may be variable along their respective lengths, but may be at least a threshold distance along the entireties of their lengths. Such a threshold may be at least 1, 2, 3, 4, 5, or 6 inches. Similarly, the fifth right-side window 116 may be horizontally spaced apart from the first right-side window 108, such as by a window (e.g., the fourth right-side window 114) or a body panel, fairing, or other opaque component of the cab 102, such as a structural, aerodynamic, or other component thereof. The horizontal spacing between the fifth-right side window 116 and the first right-side window 108 may be variable along their respective heights, but may be at least a threshold distance along the entireties of their heights. Such a threshold may be at least 1, 2, 3, 4, 5, or 6 inches.

In some embodiments, the entirety of the fifth right-side window 116, or at least a majority thereof by surface area, or at least a portion thereof, is located lower than or positioned below an entirety of a hood of the cab 102, or at least a majority thereof by surface area or at least a portion thereof. In some embodiments, the entirety of the fifth right-side window 116, or at least a majority thereof by surface area or at least a portion thereof, is located lower than or positioned below an entirety of a chest of an average height driver, average height male driver, or an average height female driver seated in the cab 102, or at least a majority thereof by surface area or at least a portion thereof. That is, for an average height driver, the fifth right-side window 116 may be below reference line 132 in FIGS. 8 and 9. In some embodiments, the entirety of the fifth right-side window 116, or at least a majority thereof by surface area or at least a portion thereof, is located at a height or elevation that is between a height or elevation of a lower chest of an average height driver, an average height male driver, or an average height female driver seated in the cab 102 and a height or elevation of feet of the driver seated in the cab 102. That is, for an average height driver, the fifth right-side window 116 may be below reference line 132 and above reference line 134 in FIGS. 8 and 9. In some embodiments, the entirety of the fifth right-side window 116, or at least a majority thereof by surface area or at least a portion thereof, is located at a height or elevation that is between a height or elevation of a lower end of the windshield 104 and a height or elevation of an upper end of a fender surrounding a wheel of the cab 102. That is, the fifth right-side window 116 may be below reference line 136 and above reference line 138 in FIGS. 8 and 9. In some embodiments, the entirety of the fifth right-side window 116, or at least a majority thereof by surface area or at least a portion thereof, is located along a fore-aft axis at a location that is forward of drive wheels of the cab 102, or between a rear end of the drive wheels of the cab 102 and a headlight of the cab 102.

As noted above, FIG. 1 illustrates primarily a right side of the truck 100 and its cab 102 and windows thereof, and the cab 102 includes windows on a left side thereof, where the windows on the left side can be the same as, similar to, and/or a mirror image of, the windows on the right side, as illustrated in FIG. 1. That is, in some embodiments, the left side of the cab 102 can have a door that is a mirror image of the door 106, a first left-side window that is a mirror image of the first right-side window 108, a second left-side window that is a mirror image of the second right-side window 110, a third left-side window that is a mirror image of the third right-side window 112, a fourth left-side window that is a mirror image of the fourth right-side window 114, and a fifth left-side window that is a mirror image of the fifth right-side window 116.

In other embodiments, however, the left side of the cab 102 may not be a mirror image of the right side of the cab 102. For example, the left side of the cab 102 may not include a door comparable to the door 106, such that a driver or other occupant of the cab 102 may enter and/or exit the cab 102 through the right side thereof but not the left side thereof. In such an embodiment, the left side of the cab 102 may have fewer windows, but the fewer windows on the left side of the cab 102 may each be larger than the windows on the right side of the cab 102, such that the overall profile of the windows on the left side of the truck 100 and cab 102 corresponds to, or is the same as, the overall profile of the windows on the right side of the truck 100 and cab 102. That is, in terms of driver visibility and other functionality, the windows on the left side of the cab 102 may be the same as, identical to, or mirror images of the windows on the right side of the cab 102.

In some embodiments, the cab 102 may not have any windows that "roll" down (that is, move or translate vertically or substantially vertically) in the traditional manner. For example, because the truck 100 is a center-drive truck 100, and visibility can generally be more challenging in center-drive trucks, the sizes of the windows in the cab 102 may be larger than they would ordinarily be in left-hand drive or right-hand drive trucks. The increased space occupied by the windows can decrease the space available to "roll" down the windows, making such features more difficult to implement.

Figure 2:
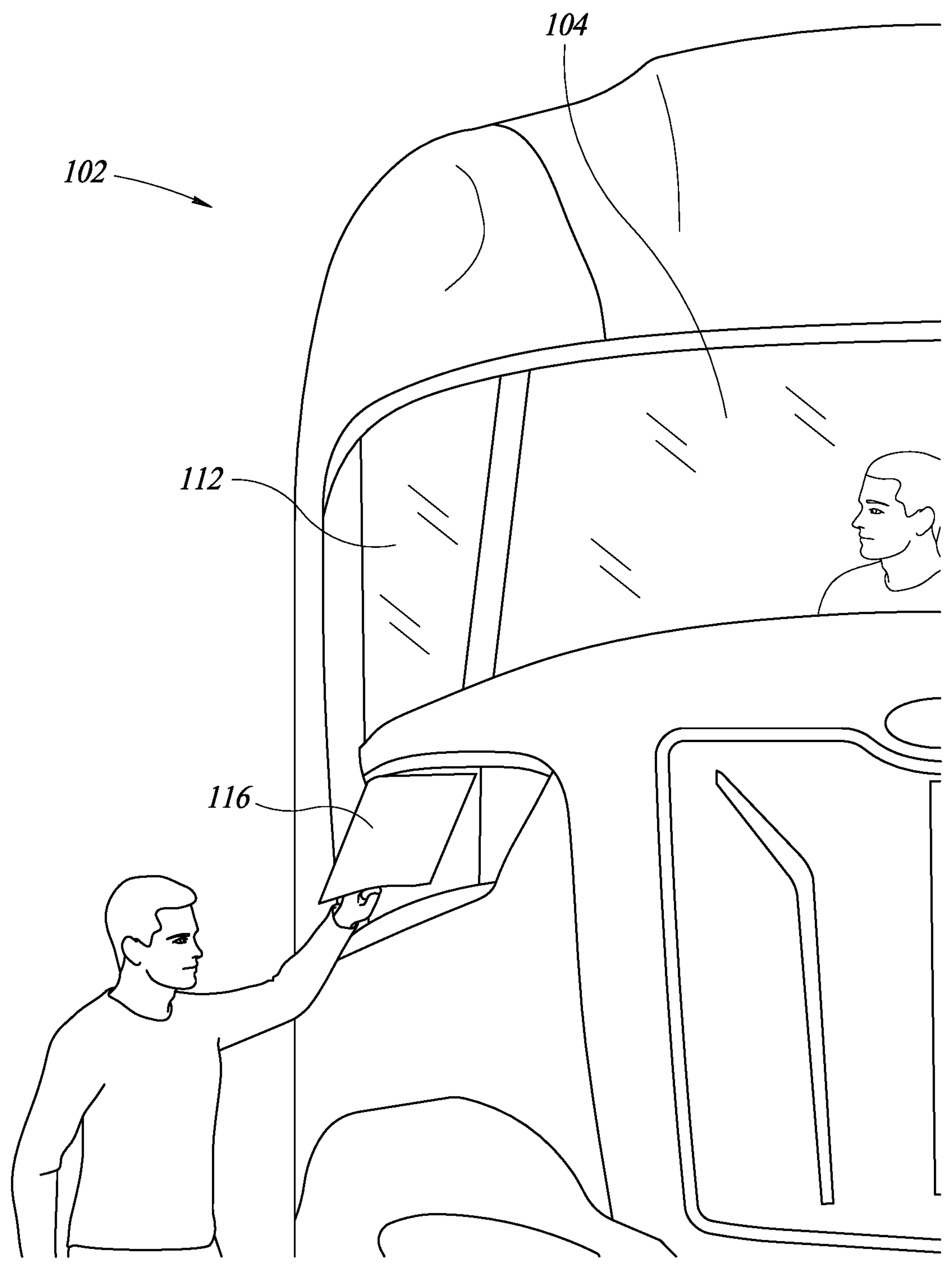
FIG. 2 illustrates use of windows of the heavy-duty truck of FIG. 1.

As noted above, the first right-side window 108 may move relative to a main body of the cab 102 with the door 106. The second, third, and fourth right-side windows 110, 112, and 114 may be stationary with respect to the main body of the cab 102. The fifth right-side window 116 may be hinged and configured to pivot or swing open with respect to the main body of the cab 102 between a closed position C (shown in FIG. 1) and an open position O (shown in FIG. 2). For example, FIG. 2 illustrates that the fifth right-side window 116 may be hinged at a top end thereof such that a bottom end thereof can rotate outward away from the rest of the cab 102 of the truck 100 to the open position O. In some embodiments, the bottom end of the fifth right-side window 116 may be configured to rotate or swing outward from the rest of the cab 102 by a distance of at least ½ inch, at least 1 inch, or at least 2 inches, and/or no more than 1 inch, no more than 2 inches, or no more than 4 inches. As illustrated in FIG. 2, opening the fifth right-side window 116 may allow a driver or other occupant within the cab 102 to interact with others outside the cab 102 of the truck 100, such as without leaving the cab 102 or their seat within the cab 102. As specific examples, the fifth right-side window 116 can be opened to allow a driver inside the cab 102 to interact with others at toll booths, security checkpoints, etc., and to exchange papers, documents, or other items back and forth between the interior and the exterior of the cab 102 with relative case without having to open the door 106 or otherwise "roll down" a window in the manner of traditional vehicles.

Figures 3, 4:
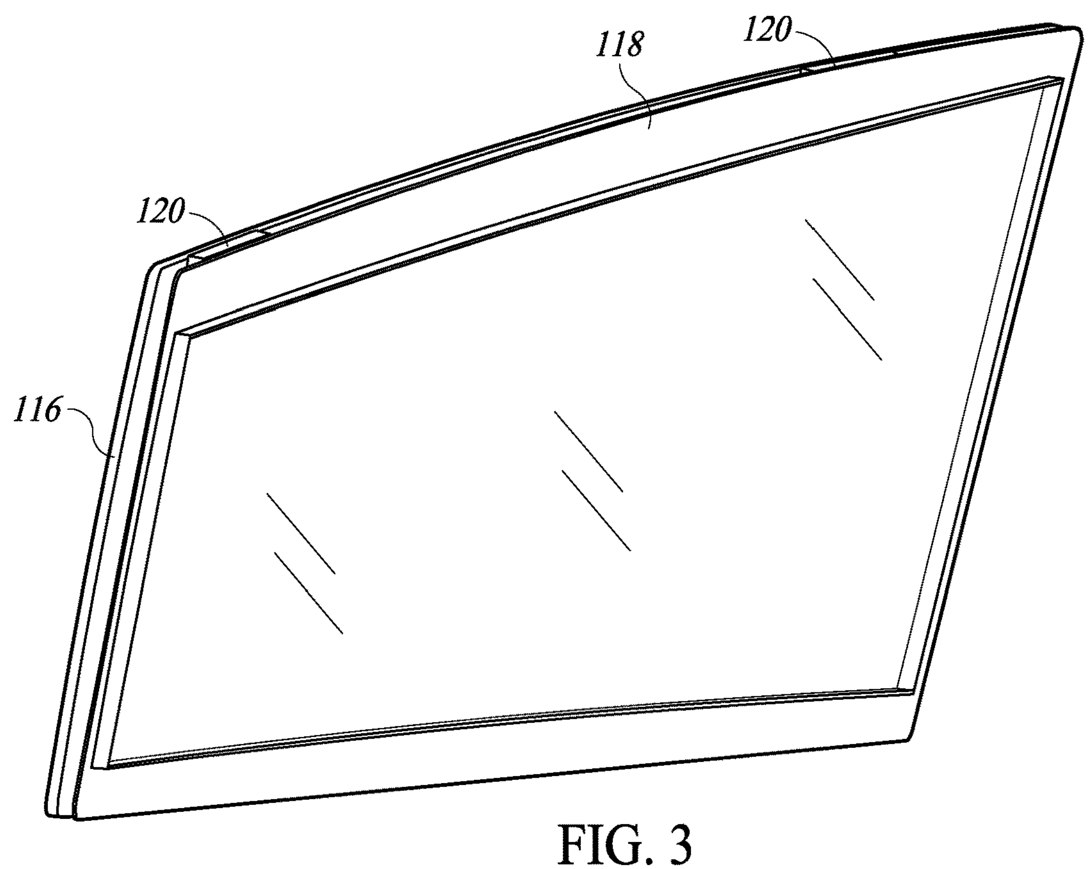
FIG. 3 illustrates an inside view of a window of the heavy-duty truck of FIG. 1.
FIG. 4 illustrates an outside view of the window of FIG. 3.

FIGS. 3 and 4 illustrate inside and outside views, respectively, of the fifth right-side window 116 coupled at its top end to a frame 118 by a pair of hinges 120. The hinges 120 allow the fifth right-side window 116 to rotate about the top end thereof with respect to the frame 118. The frame 118 can be rigidly secured to a main body of the cab 102 such that the hinges 120 allow the fifth right-side window 116 to rotate about the top end thereof with respect to the rest of the cab 102. In some embodiments, the hinges 120 may be relatively short (e.g., 100 mm long) hinges to reduce potential binding as a result of curvature of the fifth right-side window 116. In some embodiments, a gasket seal may be provided to seal a peripheral portion of the fifth right-side window 116 to a peripheral portion of the frame 118 when the fifth right-side window 116 is in the closed position C. In some embodiments, the frame 118 may be a thin-walled aluminum or plastic frame 118 and may be affixed to the cab 102, such as within a window opening thereof, by an adhesive, such as a glue or an epoxy. In some embodiments, the cab 102 may further include a 1 inch wide frit that extends around the peripheral edges of the fifth right-side window 116, to hide the hinges 120 and other components such as the gasket seal.

Figure 5:
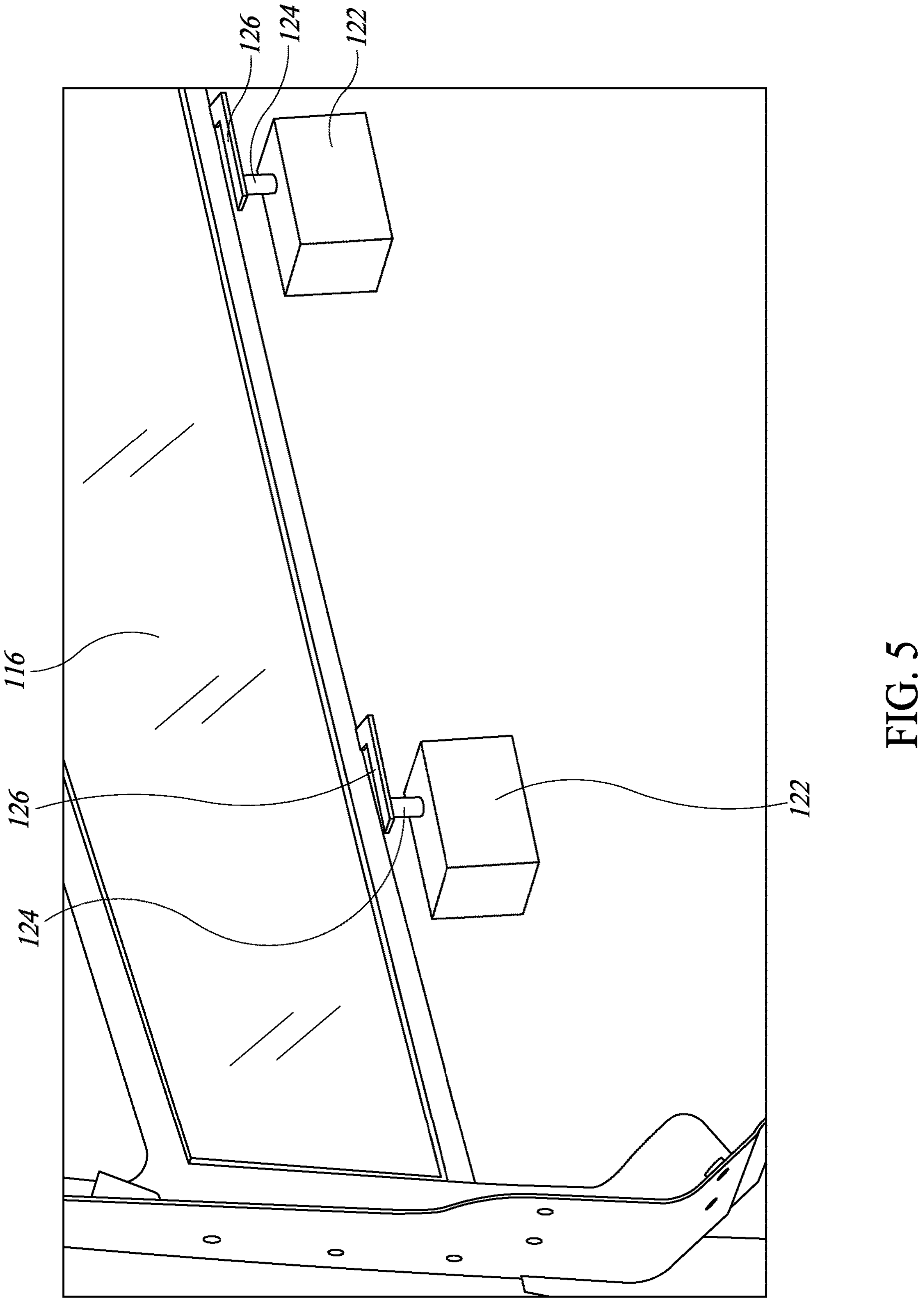
FIG. 5 illustrates another view of the window of FIGS. 3 and 4.

FIG. 5 illustrates that the cab 102 can include a pair of motors 122, which may be electric motors 122, rigidly secured to the main body of the cab 102. In some embodiments, the motors 122 may be located inside a body panel of the cab 102, such that they are not directly visible by a driver or other occupant within the cab 102. As illustrated in FIG. 5, each of the motors 122 may have an output shaft 124 that rotates when the motor 122 is activated, and an arm or bar 126 rigidly coupled to the output shaft 124, such that the arm 126 extends radially outward from the output shaft 124. The output shafts 124 may extend vertically or substantially vertically from the motors 122, and may rotate about their own central longitudinal axes when actuated by the motors 122, that is, about vertical or substantially vertical axes. The arms 126 may extend outward from the respective output shafts 124 in planes that are perpendicular or substantially perpendicular to the central longitudinal axes of the output shafts 124, that is, the arms 126 may extend outward from the respective output shafts 124 in horizontal or substantially horizontal planes.

Each of the arms 126 is coupled to a bottom end of the fifth right-side window 116 such that activation of the motors 122 causes rotation of the output shafts 124 and the arms 126, causing movement of the bottom end of the fifth right-side window 116 outward away from the rest of the cab 102, thereby opening the fifth, right-side window 116. Thus, when viewed from in front of the truck 100 and the cab 102, activating the motors 122 to open the fifth, right-side window 116 causes the fifth right-side window 116 and/or a bottom end thereof to rotate clockwise outward away from the rest of the cab 102. In some embodiments, the motors 122 may be 12V AC electric servo motors 122 and may be activated by an electrical signal which can be initiated by a driver or other occupant of the cab 102 flipping a switch, turning a knob, pressing a button, or interacting with any other human-machine interface inside the cab 102, such as on a dashboard or "dash" therein. In some embodiments, the motors 122 can turn the output shafts 124 by 45 degrees in a first direction (e.g., clockwise or counterclockwise when viewed from above) to completely open the fifth right-side window 116 from the closed position C, and can turn the output shafts 124 by 45 degrees in a second direction, opposite to the first direction, to completely close the fifth right-side window 116 from the open position O. In some embodiments, the fifth right-side window 116 may be opened manually rather than (or in addition to) by the motors 122.

As noted elsewhere herein, the motors 122 may be activated by an electrical signal which can be initiated by a driver or other occupant of the cab 102 flipping a switch, turning a knob, pressing a button, or interacting with any other human-machine interface inside the cab 102, such as on a dashboard or "dash" therein. As also noted elsewhere herein, the truck 100 and the cab 102 can include the right-side windows described herein as well as comparable left-side windows. Thus, in some embodiments, the truck 100 and the cab 102 include two rotatable windows as described herein for the fifth right-side window 116, one on each of the right and left sides of the cab 102. In such embodiments, each of the rotatable windows can be operated to open and close independently of the other. Thus, each of such windows may be activated by a respective electrical signal which can be initiated by a driver or other occupant of the cab 102 flipping a respective switch, turning a respective knob, pressing a respective button, or interacting with any other respective human-machine interface inside the cab 102, such as on a dashboard or "dash" therein.

The motors 122, output shafts 124, and arms 126 may be collectively referred to as a motor-driven actuator or motor-driven assembly, and may include other components, such as, for example, gears, bearings and other mechanical components. Although the illustrated embodiment of the motor-driven actuator includes rotational motion to actuate the window, it is appreciated that other actuators, such as linear actuators, may be used to move the window between the open position O and closed position C.

Figure 6:
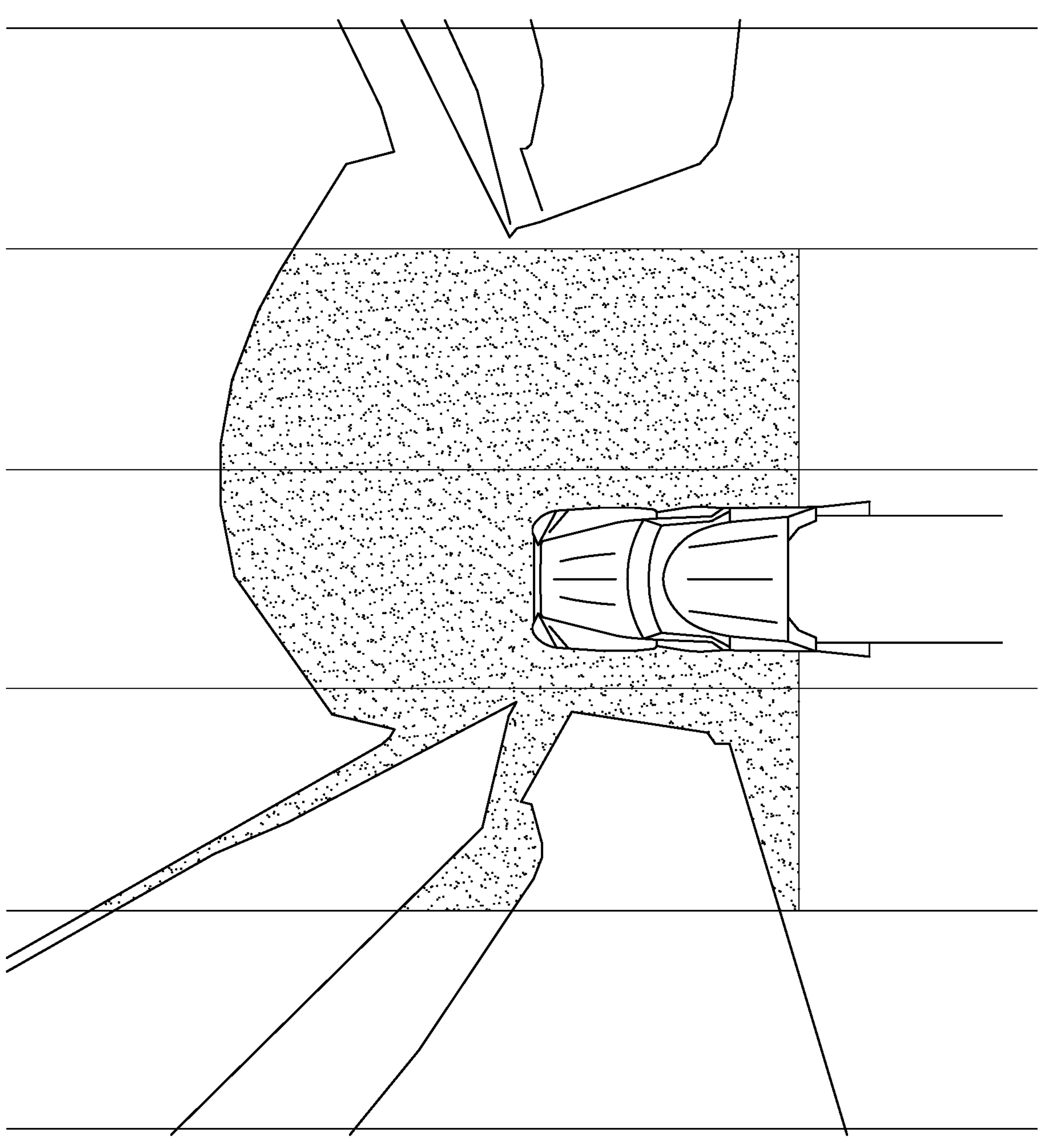
FIG. 6 illustrates driver visibility in a truck of the prior art.
Figure 7:
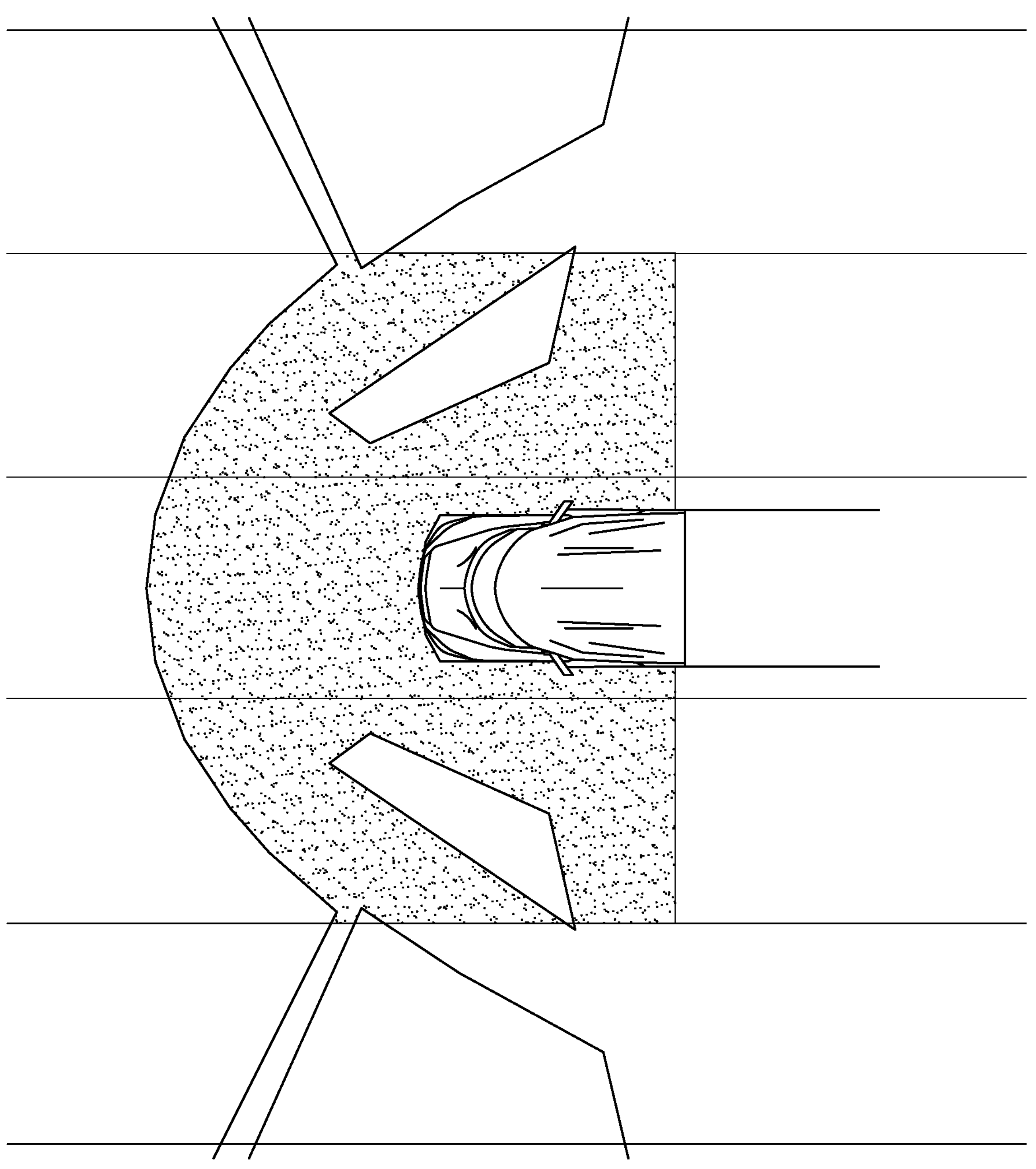
FIG. 7 illustrates driver visibility in the truck of FIG. 1.

FIG. 6 illustrates a top plan view of a prior art left-hand drive truck in the center lane of a five-lane roadway, with blind spots shaded to illustrate areas of the road surface of the center three lanes that are not visible to a driver seated in the left-hand driver's seat. As illustrated in FIG. 6, the driver in the left-hand drive truck has better visibility of the roadway on the left side of the truck than on the right side of the truck as a result of sitting closer to the left side of the truck. Similarly, FIG. 7 illustrates a top plan view of the truck 100 according to the present disclosure, which is a center-drive truck 100, in the center lane of a five-lane roadway, with blind spots shaded to illustrate areas of the road surface of the center three lanes that are not visible to a driver seated in the centered driver's seat. As illustrated in FIG. 7, the driver in the center drive truck has equal visibility of the roadway on the left side of the truck and on the right side of the truck as a result of sitting in the center of the truck along a left-right axis.

As illustrated in FIG. 7, the blind spots illustrated as shaded therein have unshaded gaps where the fifth right-side window 116 and a comparable mirror-image left-side window provide enhanced visibility of the roadway. Studies of the blind spots have shown that the total area of the blind spots illustrated as shaded in FIG. 6 is larger than the total area of the blind spots illustrated as shaded in FIG. 7, indicating that the truck 100 of the present disclosure and its windows provide an advantage over the prior art in terms of overall visibility. As illustrated in FIG. 7, the unshaded gaps in the shaded blind spots, which represent portions of the roadway surface visible to a driver of the center-drive truck 100 through the fifth right-side window 116 and a comparable left-side window, are separated from other portions of the roadway surface that are visible to the driver of the center-drive truck 100 through other windows. Because these windows provide this additional visible area of the roadway surface, which may be referred to as an "island" of visibility, they may be referred to as "look-down" windows. As illustrated in FIG. 7, there are gaps between these "islands" of visibility, that is, the portions of the roadway visible through the look-down windows, including through the fifth right-side window 116, and other portions of the roadway surface visible through the other windows. That is, when a driver or other occupant seated within the cab 102 looks directly to the side (e.g., to the right), and scans their view vertically, that is, up and down, their view of the roadway surface is partially obstructed by an intervening portion of the hood of the cab 102 or a hood extension of the cab 102 as their view transitions from the windshield 104 and/or the third right-side window 112 to the fifth right-side window 116.

Figure 8:
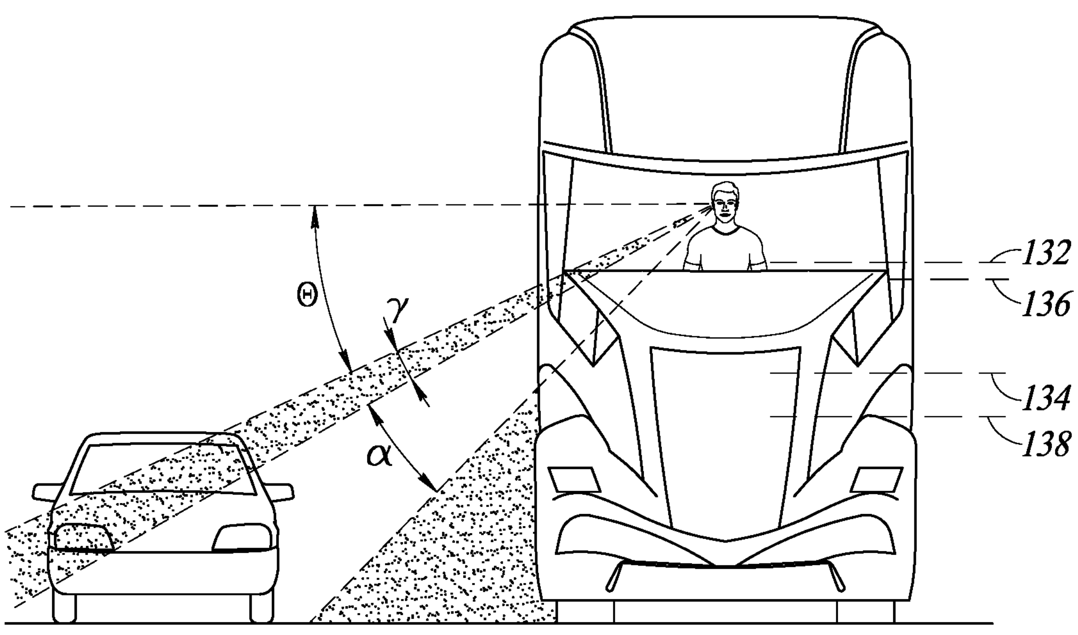
FIG. 8 illustrates driver visibility in the truck of FIG. 1.
Figure 9:
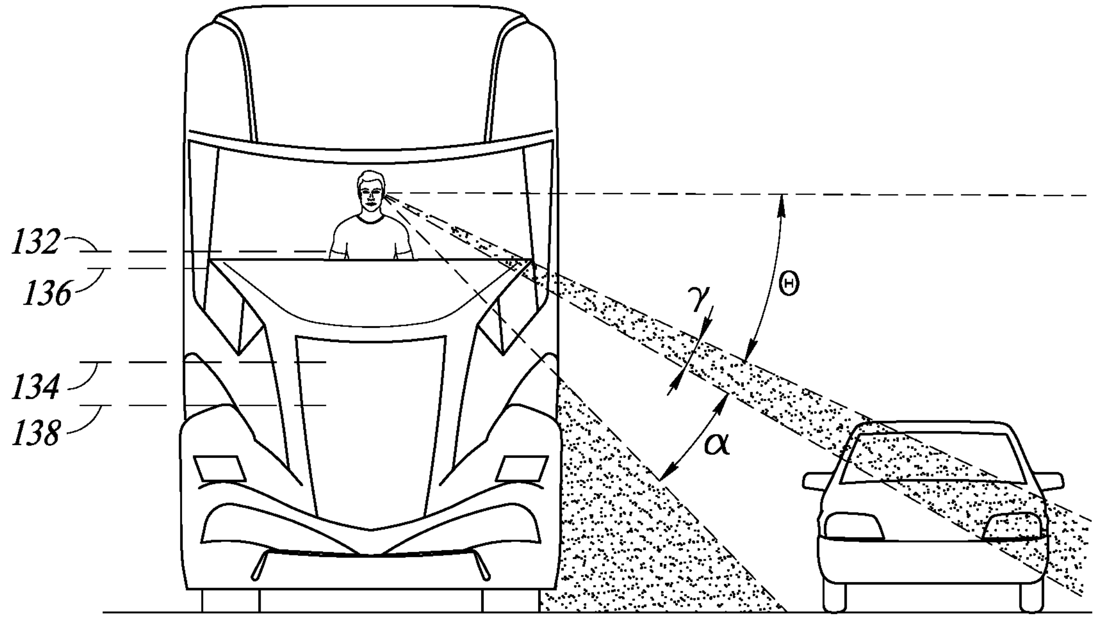
FIG. 9 illustrates driver visibility in the truck of FIG. 1.

As illustrated in FIGS. 8 and 9, a driver seated in the cab 102 may have improved visibility of a car driving in an adjacent lane through the fifth right-side window 116. For example, in a first case where a driver seated in the cab 102 has a height at the median adult male height and a relatively small passenger vehicle (e.g., a Mazda Miata) is driving in a center of an adjacent lane, the driver may have visibility of at least 50%, at least 55%, at least 60%, or 62% of the profile of the vehicle that would be visible to the driver if the cab 102 did not obstruct their view. As another example, in a second case where a driver seated in the cab 102 has a height at the fifth percentile adult female height (that is, a height corresponding to a relatively short statistical female height) and a relatively small passenger vehicle (e.g., a Mazda Miata) is driving at an edge of an adjacent lane, the driver may have visibility of at least 25%, at least 30%, at least 35%, or 37% of the profile of the vehicle that would be visible to the driver if the cab 102 did not obstruct their view. Areas not visible are shown stippled in FIGS. 8 and 9.

FIGS. 8 and 9 further illustrate regions or zones of visibility to the left and right sides of the truck 100 within a left-to-right and upward-and-downward plane (that is, within a plane perpendicular to a fore-aft axis of the truck 100). Because the truck 100 is a center-drive truck 100, the zones of visibility on the left and right sides of the truck 100 are mirror images or substantially mirror images of one another. As illustrated in FIGS. 8 and 9, the driver can see to the left and to the right from horizontal to an angle theta $\Theta$ below horizontal. In some embodiments, angle theta Q may be at least 10°, 20°, 30°, or 40°, and may be less than 20°, 30°, 40°, or 50°. As further illustrated in FIGS. 8 and 9, the driver's view is obstructed to the left and to the right from the angle theta below horizontal to an angle theta $\Theta$ plus gamma $\gamma$ below horizontal. In some embodiments, angle gamma $\gamma$ may be at least 1°. 2°, 3°, 4°, or 5°, and may be less than 2°, 3°, 4°, 5°, 10°, 15°, or 20°. As illustrated in FIGS. 8 and 9, the driver can see to the left and to the right from the angle theta $\Theta$ plus gamma $\gamma$ below horizontal to an angle theta $\Theta$ plus gamma $\gamma$ plus alpha $\alpha$ below horizontal. In some embodiments, angle alpha $\alpha$ may be at least 5°, 10°, 15°, 20°, 25°, 30°, or 35°, and may be less than 10°, 15°, 20°, 25°, 30°, 35°, or 40°. As further illustrated in FIGS. 8 and 9, the driver's view is obstructed to the left and to the right from the angle theta $\Theta$ plus gamma $\gamma$ plus alpha $\alpha$ below horizontal.

In view of the above, it is appreciated that heavy-duty trucks, and in particular center-drive heavy-duty trucks, may be outfitted with aspects of the windows and window arrangements described herein to provide enhanced visibility and other benefits over conventional windows and windshields.

Additional Considerations

The devices and systems of the disclosure each have several innovative aspects, no single one of which is solely responsible or required for the desirable attributes disclosed herein. The various features described above may be used independently of one another, or may be combined in various ways. All possible combinations and subcombinations are intended to fall within the scope of this disclosure. Various modifications to the implementations described in this disclosure may be readily apparent to those of ordinary skill in the art, and the generic principles defined herein may be applied to other implementations. Thus, the claims are not intended to be limited to the implementations shown herein, but are to be accorded the widest scope consistent with this disclosure, the principles and the novel features disclosed herein.

Certain features that may be described in this specification in the context of separate implementations also may be implemented in combination in a single implementation. Conversely, various features that may be described in the context of a single implementation also may be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

Moreover, although aspects of the various implementations have been described in the context of heavy-duty trucks, such as long-haul tractors, it is appreciated that aspects of the implementations described herein, may be applicable to other applications, such as personal vehicles.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A heavy-duty truck, comprising:

a cabin;

a window having an upper edge region and a lower edge region;

at least one hinge that rotatably couples the upper edge region of the window to the cabin to move between a closed position and an open position; and at least one motor-driven actuator coupled to the lower edge region of the window such that actuation of the motor-driven actuator in a first direction moves the lower edge region of the window away from the cabin, thereby opening the window to the open position, and actuation of the motor-driven actuator in a second direction opposite to the first direction moves the lower edge region of the window toward the cabin, thereby closing the window to the closed position, wherein the motor-driven actuator includes an output shaft that extends along a substantially vertical axis, and an arm that extends substantially horizontally from the output shaft to the lower edge region of the window.

2. The heavy-duty truck of claim 1 wherein the hinge rotatably couples the upper edge region of the window to a window frame secured to a window opening of the cabin.

3. A heavy-duty truck, comprising:

a cabin;

a window having an upper edge region and a lower edge region;

at least one hinge that rotatably couples the upper edge region of the window to the cabin to move between a closed position and an open position; and at least one motor-driven actuator coupled to the lower edge region of the window such that actuation of the motor-driven actuator in a first direction moves the lower edge region of the window away from the cabin, thereby opening the window to the open position, and actuation of the motor-driven actuator in a second direction opposite to the first direction moves the lower edge region of the window toward the cabin, thereby closing the window to the closed position, wherein the at least one hinge comprises a pair of hinges that rotatably couple the upper edge region to the window to the cabin, and wherein the at least one motor-driven actuator comprises a pair of motor-driven actuators that are coupled to the lower edge of the window such that actuation of the pair of motor-driven actuators in a first direction moves the lower edge region of the window away from the cabin, thereby opening the window to the open position, and actuation of the pair of motor-driven actuators in a second direction opposite to the first direction moves the lower edge region of the window toward the cabin, thereby closing the window to the closed position.

4. The heavy-duty truck of claim 1, wherein:

the window, the at least one hinge and the at least one motor-driven actuator form a first window assembly of the heavy-duty truck, and wherein the heavy-duty truck further comprises a second window assembly, the first window assembly is on a first side of the cabin and the second window assembly is on a second side of the cabin opposite to the first side of the cabin, and the second window assembly is a mirror image of the first window assembly.

5. The heavy-duty truck of claim 4, wherein:

the first window assembly is configured to be actuated, independently of the second window assembly, by a first electrical signal initiated by a human occupant of the cabin interacting with a human-machine interface inside the cabin; and the second window assembly is configured to be actuated, independently of the first window assembly, by a second electrical signal initiated by the human occupant of the cabin interacting with the human-machine interface inside the cabin.

6. The heavy-duty truck of claim 1 wherein the heavy-duty truck is a center-drive truck.

7. The heavy-duty truck of claim 1 wherein the cabin is devoid of roll-down windows that translate substantially vertically to open.

8. A heavy-duty truck, comprising:

a cabin including a first side door having a first side door window, and including a second side door having a second side door window;

drive wheels;

one or more windshield sections positioned between and forward of the first side door window and the second side door window, the one or more windshield sections forming a windshield that extends between the first side door window and the second side door window;

a lower first side window positioned forward of the first side door window and below the windshield and spaced apart from the first side door window and the windshield; and a lower second side window positioned forward of the second side door window and below the windshield and spaced apart from the second side door window and the windshield, wherein each of the lower first side window and the lower second side window is located within a hood of the heavy-duty truck, with a respective portion of the hood extending rearward and separating a respective one of the lower first side window and the lower second side window from the windshield, and wherein each of the lower first side window and the lower second side window extend from a respective rear end near a respective one of the first and second side doors to a respective front end beyond the drive wheels.

9. The heavy-duty truck of claim 8 wherein each of the lower first side window and lower second side window is rotatable relative to the cabin and is configured to rotate between an open position and a closed position.

10. The heavy-duty truck of claim 9 wherein each of the first side door window and second side door window is stationary and not configured to open or close relative to the first side door and second side door, respectively, and wherein the windshield is stationary and is not configured to open or close.

11. The heavy-duty truck of claim 8 wherein:

at least a majority of each of the lower first side window and lower second side window by surface area is located at an elevation that is between a lower end of the windshield and an upper end of a respective fender of the heavy-duty truck; and at least a majority of each of the lower first side window lower second side window is located along a fore-aft axis at a location that is between a rear end of the drive wheels of the heavy-duty truck and a headlight of the heavy-duty truck.

12. A heavy-duty truck, comprising:

a cabin including a first side door having a first side door window, and including a second side door having a second side door window;

drive wheels;

one or more windshield sections positioned between and forward of the first side door window and the second side door window, the one or more windshield sections forming a windshield that extends between the first side door window and the second side door window;

a lower first side window positioned forward of the first side door window and below the windshield; and a lower second side window positioned forward of the second side door window and below the windshield, wherein each of the lower first side window and the lower second side window is located within a hood of the heavy-duty truck, with a respective portion of the hood extending rearward and separating a respective one of the lower first side window and the lower second side window from the windshield, wherein each of the lower first side window and the lower second side window extend from a respective rear end near a respective one of the first and second side doors to a respective front end beyond the drive wheels, and wherein, when the heavy-duty truck is on a roadway surface and a driver is seated in the cabin in a driving position, a portion of the roadway surface visible to the driver includes a respective island of visibility on each side of the heavy-duty truck that includes a portion of the roadway surface visible through a respective one of the lower first side window and the lower second side window.

13. The heavy-duty truck of claim 12, wherein:

the lower second side window is arranged in a mirror-image configuration to the lower first side window on a second side of the cabin opposite to a first side of the cabin.

14. The heavy-duty truck of claim 12 wherein each of the lower first side window and lower second side window is rotatable relative to the cabin and is configured to rotate between an open position and a closed position.

15. The heavy-duty truck of claim 14 wherein each of the first side door window and second side door window is stationary and is not configured to open or close relative to the first side door and second side door, respectively, and wherein the windshield is stationary and is not configured to open or close.

16. The heavy-duty truck of claim 12, wherein, when a driver seated in the cabin has a height at the median adult male height and a passenger vehicle is driving in a center of a lane adjacent to the heavy-duty truck, the driver has visibility of at least 50%, at least 55% or at least 60% of the profile of the passenger vehicle that would be visible to the driver if the cabin did not obstruct their view.

17. The heavy-duty truck of claim 12, wherein, when a driver seated in the cabin has a height at the fifth percentile adult female height and a passenger vehicle is driving at an edge of a lane adjacent to the heavy-duty truck, the driver has visibility of at least 25%, at least 30%, or at least 35% of the profile of the passenger vehicle that would be visible to the driver if the cabin did not obstruct their view.

18. The heavy-duty truck of claim 12, wherein the one or more windshield sections of the windshield includes a respective supplemental windshield section that is adjacent to and aft of a main windshield on a respective side of the cabin and separated by or interfacing at a respective A-pillar of the heavy-duty truck.

* * * * *